United States Patent [19]

Antberg et al.

[11] Patent Number: 5,086,134
[45] Date of Patent: Feb. 4, 1992

[54] PROCESS FOR THE PREPARATION OF AN ETHYLENE/PROPYLENE COPOLYMER

[75] Inventors: Martin Antberg, Hofheim am Taunus; Walter Spaleck; Jürgen Rohrmann, both of Liederbach; Hartmut Lüker, Hofheim am Taunus; Andreas Winter, Kelkheim, all of Fed. Rep. of Germany

[73] Assignee: Hoechst Aktiengesellschaft, Frankfurt am Main, Fed. Rep. of Germany

[21] Appl. No.: 424,116

[22] Filed: Oct. 19, 1989

[30] Foreign Application Priority Data

Oct. 22, 1988 [DE] Fed. Rep. of Germany ....... 3836059

[51] Int. Cl.$^5$ .................. C08F 2/02; C08F 4/602; C08F 210/16
[52] U.S. Cl. .................... 526/126; 526/132; 526/133; 526/150; 526/909; 526/153; 526/160; 526/348; 526/902
[58] Field of Search ............... 526/160, 126, 132, 133, 526/150, 153

[56] References Cited

U.S. PATENT DOCUMENTS

| | | |
|---|---|---|
| 4,542,199 | 9/1985 | Kaminsky et al. |
| 4,794,096 | 12/1988 | Ewen ................... 526/160 |
| 4,871,705 | 10/1989 | Hoel .................... 526/160 |
| 4,952,540 | 8/1990 | Kioka et al. ............ 526/160 |

FOREIGN PATENT DOCUMENTS

| | | |
|---|---|---|
| 0069951 | 4/1987 | European Pat. Off. |
| 129368 | 12/1984 | Fed. Rep. of Germany ...... 526/160 |
| 3726067 | 2/1989 | Fed. Rep. of Germany . |
| 63-92621 | 4/1988 | Japan .................... 526/160 |

*Primary Examiner*—Edward J. Smith

[57] ABSTRACT

The invention relates to a process for the preparation of a predominantly crystalline ethylene/propylene copolymer having less than 15 mol % of propylene units, which can be carried out in liquid propylene as the suspending agent, if metallocene catalyst components of the formulae I, II or III are employed and the partial pressures of ethylene and propylene have a specific ratio.

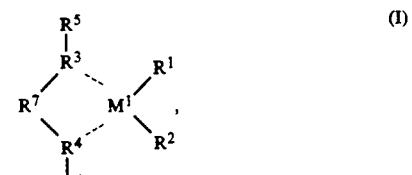

(I)

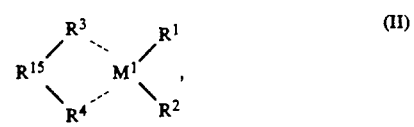

(II)

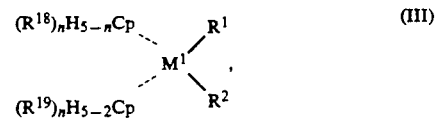

(III)

By means of this process, it is possible to increase the possible uses of polymerization plants which work with liquid propylene.

11 Claims, No Drawings

PROCESS FOR THE PREPARATION OF AN ETHYLENE/PROPYLENE COPOLYMER

DESCRIPTION

The present invention relates to a process for the preparation of predominantly crystalline ethylene/propylene copolymers of various molecular weight ranges by means of metallocene/aluminoxane catalysts.

A process for the preparation of ethylene/1-olefin copolymers by means of metallocene/aluminoxane catalysts has already been described (cf. EP 69,951). In this process, a dispersant such as, for example, toluene, which is, in principle, inert towards the catalysts mentioned is used.

The use of metallocene/aluminoxane catalyst systems in liquid propylene as dispersant and monomer has also been proposed (cf. DE 3,726, 067). However, these metallocenes and the conditions used give highly isotactic polypropylene as the polymerization product. A preactivation method for the metallocenes, which leads to an increase in the activity of the catalysts and to an improvement in the particle morphology of the polymers, has also been proposed.

Industrial production plants which work with liquid propylene as dispersant (and monomer) are widely in use for the preparation of highly isotactic polypropylene and 15 mol % of ethylene). However, so far no process was known also to prepare predominantly crystalline ethylene/propylene copolymers (containing <15 mol % of propylene) in these types of plants.

It has been found that predominantly crystalline ethylene/propylene copolymers containing 15 mol % of propylene units can be prepared in liquid propylene as dispersant, if metallocene catalyst components of a certain structure are used and the partial pressures of ethylene and propylene have a specific ratio.

The invention accordingly relates to a process for the preparation of an ethylene/propylene copolymer containing less than 15 mol % of propylene units, relative to the entire polymer, by polymerization of ethylene and propylene in a suspending agent, at a temperature of $-60°$ to $90°$ C., at a pressure of 0.5 to 150 bar, in the presence of a catalyst which consists of a metallocene and an aluminoxane of the formula IV

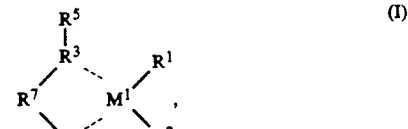

in the case of the linear type and/or of the formula V

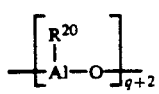

in the case of the cyclic type, in which in formulae IV and V $R^{20}$ is a $C_1$–$C_6$-alkyl group and q is an integer from 2 to 50, which comprises carrying out the polymerization in liquid propylene as suspending agent, in which the ratio of the partial pressure $P_{C2}$ of ethylene in the gas phase to the partial pressure $P_{C3}$ of propylene in the gas phase

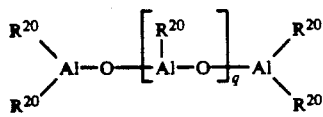 is greater than 0.6 and the metallocene is a compound of the formulae I, II or III

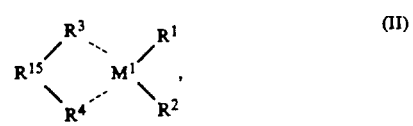

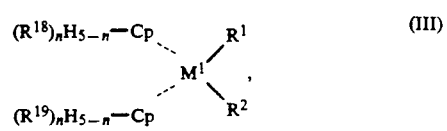

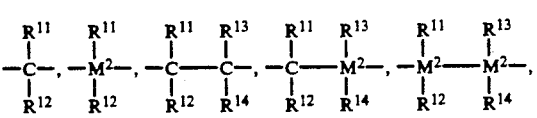

in which in formulae I, II and III $M^1$ is a metal from group IVb, Vb or VIb of the periodic table, $R^1$ and $R^2$ are identical or different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom, $R^3$ and $R^4$ are identical or different and are an indenyl or tetrahydroindenyl radical in which the five-membered rings of the radicals $R^3$ and $R^4$ form a sandwich structure with the central atom $M^1$, $R^5$ and $R^6$ are identical or different, and are substituents in the 3-position of $R^3$ and $R^4$ or are radicals of the formulae

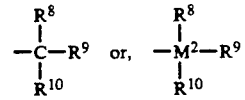

in which $M^2$ is silicon, germanium or tin, $R^8$, $R^9$ and $R^{10}$ are identical or different and are a halogen atom, a $C_1$–$C_{10}$-alkyl group, a $C_1$–$C_{10}$-fluoroalkyl group, a $C_6$–$C_{10}$-aryl group, a $C_6$–$C_{10}$-fluoroaryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group, a $C_7$–$C_{40}$-alkylaryl group, a trihalosilyl group, a $C_1$–$C_{10}$-trialkylsilyl group or a $C_1$–$C_{10}$-trialkoxysilyl group, $R^7$ is $$-\overset{R^{11}}{\underset{R^{12}}{C}}-, \ -\overset{R^{11}}{\underset{R^{12}}{M^2}}-, \ -\overset{R^{11}}{\underset{R^{12}}{C}}-\overset{R^{13}}{\underset{R^{14}}{C}}-, \ -\overset{R^{11}}{\underset{R^{12}}{C}}-\overset{R^{13}}{\underset{R^{14}}{M^2}}-, \ -\overset{R^{11}}{\underset{R^{12}}{M^2}}-\overset{R^{13}}{\underset{R^{14}}{M^2}}-,$$

$=BR^{11}$, $=AlR^{11}$, $-Ge-$, $-Sn-$, $-O-$, $-S-$, $=S=O$, $=SO_2$, $=NR^{11}$, $=CO$, $=PR^{11}$ or $=P(O)R^{11}$, where $R^{11}$, $R^{12}$, $R^{13}$ and $R^{14}$ are identical or different and are a hydrogen atom, a halogen atom, a $C_1$–$C_{10}$- alkyl group, a $C_1-C_{10}$-fluoroalkyl group, a $C_6-C_{10}$-aryl group, a $C_6-C_{10}$-fluoroaryl group, a $C_1-C_{10}$-alkoxy group, a $C_2-C_{10}$-alkenyl group, a $C_7-C_{40}$-arylalkyl group, a $C_8-C_{40}$-arylalkenyl group, or a $C_7-C_{40}$-alkylaryl group
and $R^7$ together with the radicals $R^3$ and $R^4$ forms a ring, $R^7$ being linked to the radicals $R^3$ and $R^4$ in the 1-position of the radicals $R^3$ and $R^4$, $R_1$ is

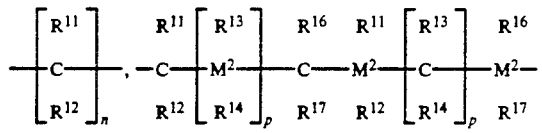

in which $R^{16}$ and $R^{17}$ are identical or different and are a hydrogen atom, a halogen atom, a $C_1-C_{10}$-alkyl group, a $C_1-C_{10}$-fluoroalkyl group, a $C_6-C_{10}$-aryl group, a $C_6-C_{10}$-fluoroaryl group, a $C_1-C_{10}$-alkoxy group, a $C_2-C_{10}$-alkenyl group, a $C_7-C_{40}$-arylalkyl group, a $C_8-C_{40}$-arylalkenyl group or a $C_7-C_{40}$-alkylaryl group, n is the number 3, 4 or 5 and p is 1, 2 or 3, and $R^{15}$ together with the radicals $R^3$ and $R^4$ forms a ring, $R^{15}$ being linked to the radicals $R^3$ and $R^4$ in the 1-position of the radicals $R^3$ and $R^4$, Cp is a cyclopentadienyl radical and $R^{18}$ and $R^{19}$ are identical or different substituents on the cyclopentadienyl radicals and are a $C_1-C_{10}$-alkyl group, a $C_1-C_{10}$-alkoxy group, a $C_6-C_{10}$-aryl group, a $C_6-C_{10}$-aryloxy group, a $C_2-C_{10}$-alkenyl group, a $C_8-C_{40}$-arylalkyl group, a $C_7-C_{40}$-alkylaryl group, a $C_8-C_{40}$-arylalkenyl group or a halogen atom.

The catalyst to be used for the process according to the invention consists of a metallocene compound of the structure types A, B or C according to formulae I, II or III and an aluminoxane.

These three structure types are distinguished by strong steric screening of the catalytically active transition metal central atom, which results in a particularly high selectivity of the polymerizing catalytic center towards the small monomer ethylene. Even in the presence of liquid propylene (=highest possible propylene concentration) and of ethylene, this leads mainly to incorporation of ethylene in the chain.

In formula I which represents structure type A

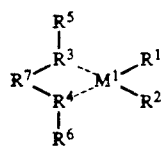

(I)

$M^1$ is a metal from group IVb, Vb or VIb of the periodic table, for example titanium, zirconium, hafnium, vanadium, niobium, tantalum, chromium, molybdenum, tungsten, preferably zirconium and hafnium.

$R^1$ and $R^2$ are identical or different and are a hydrogen atom, a halogen atom, preferably chlorine, a $C_1-C_{10}$-alkyl group, preferably $C_1-C_3$-alkyl group, a $C_1-C_{10}$-alkoxy group, preferably $C_1-C_3$-alkoxy group, a $C_6-C_{10}$-aryl group, preferably $C_6-C_8$-aryl group, a $C_6-C_{10}$-aryloxy group, preferably $C_6-C_8$-aryloxy group, a $C_2-C_{10}$-alkenyl group, preferably $C_2-C_4$-alkenyl group, a $C_7-C_{40}$-arylalkyl group, preferably $C_7-C_{10}$-arylalkyl group, a $C_7-C_{40}$-alkylaryl group, preferably $C_7-C_{12}$-alkylaryl group, a $C_8-C_{40}$-arylalkenyl group, preferbly $C_8-C_{12}$-arylalkenyl group.

$R^3$ and $R^4$ are identical or different, preferably identical, and are an indenyl or tetrahydroindenyl radical in which the five-membered rings of the radicals $R^3$ and $R^4$ form a sandwich structure with the central atom $M^1$.

$R^5$ and $R^6$ are identical or different, preferably identical, and are substituents in the 3-position of the five-membered rings mentioned, which can have the following structure:

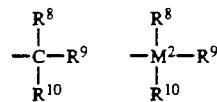

in which $M^2$ is silicon, germanium or tin, preferably silicon.

$R^8$, $R^9$ and $R^{10}$ are identical or different, preferably identical, and are a halogen atom, a $C_1-C_{10}$-alkyl group, preferably $C_1-C_4$-alkyl group, in particular a methyl group, a $C_1-C_{10}$-fluoroalkyl group, preferably a $CF_3$ group, a $C_6-C_{10}$-aryl group, preferably $C_6-C_8$-aryl group, a $C_6-C_{10}$-fluoroaryl group, preferably a pentafluorophenyl group, a $C_1-C_{10}$-alkoxy group, preferably $C_1-C_4$-alkoxy group, in particular a methoxy group, a $C_2-C_{10}$-alkenyl group, preferably $C_2-C_4$-alkenyl group, a $C_7-C_{40}$-arylalkyl group, preferably $C_7-C_{10}$-arylalkyl group, a $C_8-C_{40}$-arylalkenyl group, preferably $C_8-C_{12}$-arylalkenyl group or a $C_7-C_{40}$-alkylaryl group, preferably $C_7-C_{12}$-alkylaryl group, a trihalosilyl group, a $C_1-C_{10}$-trialkylsilyl group, preferably $C_1-C_4$-trialkylsilyl group, in particular a trimethylsilyl group or a $C_1-C_{10}$-trialkoxysilyl group, preferably $C_1-C_4$-trialkoxysilyl group.

$R^7$ is

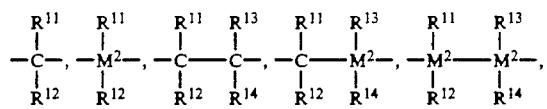

$=BR^{11}$, $=AlR^{11}$, $-Ge-$, $-Sn-$, $-O-$, $-S-$, $=S=O$, $=SO_2$, $=NR^{11}$, $=CO$, $=PR^{11}$ or $=P(O)R^{11}$, preferably

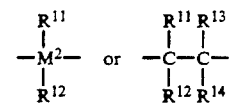

in which $M^2$ has the above meaning.

$R^{11}$, $R^{12}$, $R^{13}$ and $R^{14}$ are identical or different, and are a hydrogen atom, a halogen atom, a $C_1-C_{10}$-alkyl group, preferably $C_1-C_4$-alkyl group, in particular a methyl group, a $C_1-C_{10}$-fluoroalkyl group, preferably a $CF_3$ group, a $C_6-C_{10}$-aryl group, preferably $C_6-C_8$-aryl group, a $C_6-C_{10}$-fluoroaryl group, preferably a pentafluorophenyl group, a $C_1-C_{10}$-alkoxy group, preferably $C_1-C_4$-alkoxy group, in particular a methoxy group, a $C_2-C_{10}$-alkenyl group, preferably $C_2-C_4$-alkenyl group, a $C_7-C_{40}$-arylalkyl group, preferably $C_7-C_{10}$-arylalkyl group, a $C_8-C_{40}$-arylalkenyl group, preferably $C_8-C_{12}$-arylalkenyl group or a $C_7-C_{40}$-alkylaryl group, preferably $C_7-C_{12}$-alkylaryl group.

$R^7$ together with the radicals $R^3$ and $R^4$ forms a ring, $R^7$ being linked with the radicals $R^3$ and $R^4$ in the 1-position of the radicals $R^3$ and $R^4$.

The metallocenes of structure type A can be prepared according to the following reaction scheme:

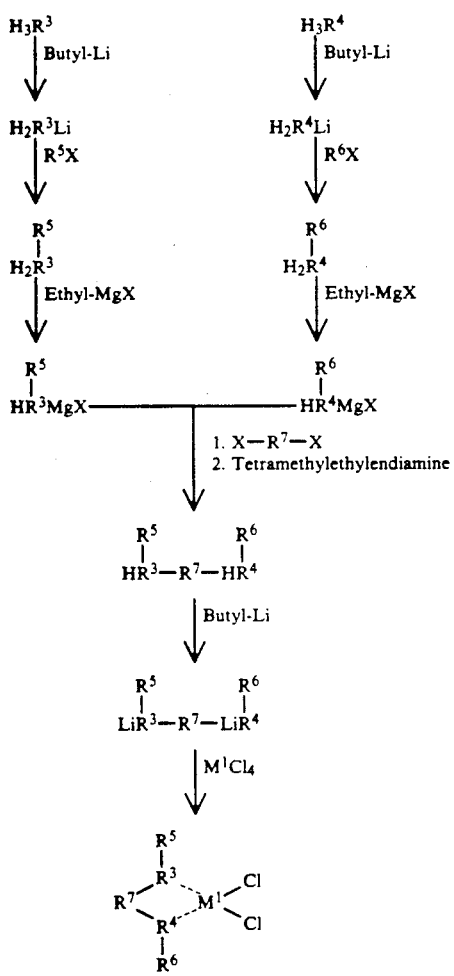

X is Cl, Br, I or O-tosyl.

Instead of the two chlorine atoms, it is also possible to introduce other $R^1$ and $R^2$ groups by known substitution reactions.

If $R^3$ and $R^4$ are indenyl radicals, they can be converted into tetrahydroindenyl radicals by hydrogenation of the compound (II) by known methods.

A particularly preferred metallocene of structure type B is propylenebis[1-(3-trimethysilylindenyl)]zirconium dichloride.

In formula III which represents structure type B

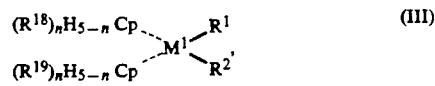

$M^1$, $R^1$, $R^2$, $R^3$ and $R^4$ have the abovementioned meanings.

$R^{15}$ is

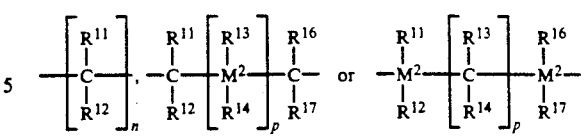

in which $M^2$, $R^{11}$, $R^{12}$, $R^{13}$ and $R^{14}$ have the abovementioned meaning and $R^{16}$ and $R^{17}$ have the meanings of $R^{11}$, $R^{12}$, $R^{13}$ or $R^{14}$.

n is 3, 4 or 5 and p is 1, 2 or 3.

$R^{15}$ together with the radicals $R^3$ and $R^4$ form a ring, $R^{15}$ being linked to $R^3$ and $R^4$ in the 1-position of the radicals $R^3$ and $R^4$.

The metallocenes of structure type B can be prepared by the following reaction scheme:

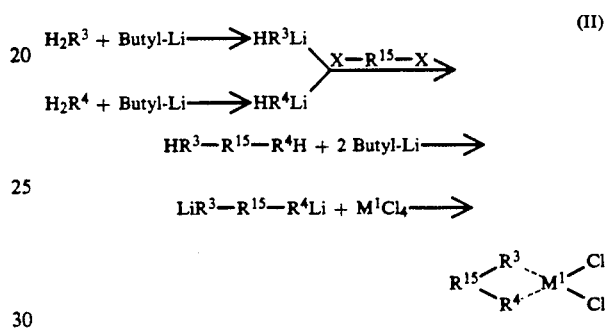

X is Cl, Br, I or O-tosyl.

Instead of the two chlorine atoms, it is also possible to introduce other $R^1$ and $R^2$ groups by known substitution reactions.

If $R^3$ and $R^4$ are indenyl radicals, they can be converted into tetrahydroindenyl radicals by hydrogenation of the compound (II) by known methods.

A particularly preferred metallocene of structure type B is propylenebis(1-indenyl)zirconium dichloride.

In formula III which represents structure type C, $$(R^{18})_nH_{5-n}Cp \diagdown_{M^1} \diagup^{R^1}_{R^2} \quad (III)$$
$$(R^{19})_nH_{5-n}Cp \diagup \quad \diagdown$$

$M^1$, $R^1$ and $R^2$ have the already mentioned meanings.

Cp is a cyclopentadienyl radical and n is the number 3, 4 or 5.

$R^{18}$ and $R^{19}$ are identical or different, preferably identical, radicals on the cyclopentadienyl rings and are a halogen atom, a $C_1$-$C_{10}$-alkyl group, preferably $C_1$-$C_4$-alkyl group, in particular a methyl group, a $C_1$-$C_{10}$-fluoroalkyl group, preferably a $CF_3$ group, a $C_6$-$C_{10}$-aryl group, preferably $C_6$-$C_8$-aryl group, a $C_6$-$C_{10}$-fluoroaryl group, preferably a pentafluorophenyl group, a $C_1$-$C_{10}$-alkoxy group, preferably $C_1$-$C_{10}$-alkoxy group, in particular a methoxy group, a $C_2$-$C_{10}$-alkenyl group, preferably $C_2$-$C_4$-alkenyl group, a $C_7$14 $C_{40}$-arylalkyl group, preferably $C_7$-$C_{10}$-arylalkyl group, a $C_8$-$C_{40}$-arylalkenyl group, preferably $C_8$-$C_{12}$-arylalkenyl group or a $C_7$-$C_{40}$-alkylaryl group, preferably $C_7$-$C_{12}$-alkylaryl group.

The synthesis of metallocenes of structure type C can be carried out by methods described in the literature, for example in: J. M. Manriquez, D. R. McAlister, E. Rosenberg, A. M. Shiller, K. L. Williamson, S. I. Chan, J. E. Bercaw J. Amer. Chem. Soc. 100, 3078 (1978).

A particularly preferred metallocene of structure type C is bis(pentamethylcyclopentadienyl)zirconium dichloride.

In addition to the metallocene, the catalyst system to be used according to the invention additionally contains an alkyl aluminum compound as activator. This activator is an aluminoxane of the formula IV

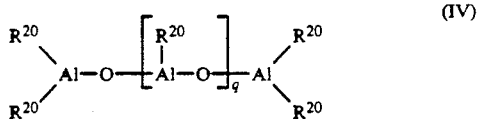

in the case of the linear type and/or of the formula V

in the case of the cyclic type. In these formula, $R^{20}$ is a $C_1$-$C_6$-alkyl group, preferably methyl, ethyl or isobutyl, in particular methyl and q is an integer from 2 to 50, preferably 10 to 40. However, the exact structure of the aluminoxane is not secured.

The aluminoxane can be prepared by different methods.

One possibility is the careful addition of water to a dilute solution of a trialkyl aluminum by stirring the solution of trialkyl aluminum and the water each in small portions into an initially introduced very large amount of an inert solvent and waiting after each addition until the evolution of gas has ceased.

In a different method, finely powdered copper sulfate pentahydrate is suspended in toluene, and at about $-20°$ C. trialkyl aluminum is added in a glass flask under inert gas in such an amount that 1 mol of $CuSO_4 5H_2O$ is available for every 4 Al atoms. After slow hydrolysis with the elimination of alkane, the reaction mixture is left to stand at room temperature for 24 to 48 hours, during which cooling may be necessary to prevent the temperature from rising above 30° C. The aluminoxane dissolved in toluene is then filtered from copper sulfate, and the solution is concentrated in vacuo. It is assumed that in this preparation method the low-molecular-weight aluminoxanes undergo condensation with the elimination of trialkyl aluminum to give higher oligomers.

Aluminoxanes are further obtained by reacting trialkyl aluminum, preferably trimethyl aluminum, which is dissolved in an inert aliphatic or aromatic solvent, preferably heptane or toluene, at a temperature of $-20°$ to $100°$ C. with hydrated aluminum salts, preferably aluminum sulfate. In this reaction, the volume ratio between solvent and the alkyl aluminum used is 1:1 to 50:1—preferably 5:1—and the reaction time which can be controlled by the elimination of the alkane is 1 to 200 hours—preferably 10 to 40 hours.

Of the hydrated aluminum salts, in particular those are used which have a high content of water of crystallization. Particular preference is given to aluminum sulfate hydrate, in particular the compounds $Al_2(SO_4)_3 16H_2O$ and $Al_2(SO_4)_3 18H_2O$ which have a particularly high content of water of crystallization of 16 and 18 mol of $H_2O$/mol of $Al_2(SO_4)_3$.

A further variation for the preparation of aluminoxanes consists in dissolving trialkyl aluminum, preferably trimethyl aluminum, in the suspending agent initially introduced into the polymerization boiler, preferably in the liquid monomer, in heptane or toluene and then reacting the aluminum compound with water.

In addition to the process for the preparation of alumin-oxanes described above, other methods are suitable.

It is possible to preactivate the metallocene by means of an aluminoxane of the formula IV and/or V before using it in the polymerization reaction. This considerably increases the polymerization activity.

The preactivation of the transition metal compound is carried out in solution. This is preferably done by dissolving the metallocene in a solution of the aluminoxane in an inert hydrocarbon. A suitable inert hydrocarbon is an aliphatic or aromatic hydrocarbon. Preferably, toluene is used. The concentration of the aluminoxane in the solution is in the range from about 1% by weight up to the saturation limit, preferably 5 to 30% by weight, each relative to the entire solution. The metallocene can be used in the same concentration, but preferably it is used in an amount of $10^{-4}$ to 1 mol per mol of aluminoxane. The preactivation time is 5 minutes to 60 hours, preferably 5 to 60 minutes. The temperature in this process is from $-78°$ C. to $100°$ C., preferably $0°$ to $70°$ C.

The catalyst system to be used according to the invention is used for the copolymerization of ethylene with propylene and, if desired, a further 1-olefin which had 4 to 18 carbon atoms, for example 1-butene, 1-hexene, 4-methyl-1-pentene, or 1-octene.

The polymerization is carried out continuously or batchwise in liquid propylene, in one or many steps at a temperature from $-60°$ C. to $90°$ C., preferably $20°$ C. to $70°$ C. Ethylene is added to the polymerization mixture in such an amount that a partial pressure ratio of $P_{C2}P_{C3}>0.6$, preferably $>0.9$ ($P_{C2}$=partial pressure of ethylene in the gas phase above the suspension; $P_{C3}$=partial pressure of propylene in the gas phase above the suspension) is established above the liquid phase. The total pressure is 0.5 to 150, preferably 14.5 to 120 bar.

The metallocene compound is employed in a concentration, relative to the transition metal, of $10^{-3}$ to $10^{-8}$, preferably $10^{-4}$ to $10^{-7}$, mol of transition metal per $dm^3$ of liquid propylene. The aluminoxane is used in a concentration of $10^{-4}$ to $10^{-1}$ mol, preferably $10^{-3}$ to $10^{-2}$ mol per $dm^3$ of liquid propylene. However, in principle higher concentrations are also possible.

The molecular weight of the polymer can be regulated in a known manner; preferably, hydrogen is used for this. The process according to the invention increases the versality of the use of plants in which polymerization can be carried out in liquid propylene. Depending on the propylene content in the polymer and the density of the product affected thereby, the predominantly crystalline ethylene/propylene copolymers are obtained as "HDPE" ("High Density Polyethylene"), "MDPE" ("Medium Density Polyethylene") and "LLDPE" ("Linear Low Density Polyethylene"). By using molecular weight regulators, low-molecular weight ethylene/propylene copolymers, which can be deignated as polyethylene waxes ("HDPE", "MDPE" and "LLDPE" waxes), can also be obtained in the process according to the invention. Even the preparation of ethylene/propylene/1-olefin terpolymers is possible by means of the process according to the invention.

The examples which follow are intended to illustrate the invention.

VN is the viscosity number in cm$^3$/g,
$M_w$ is the average molecular weight in g/mol,
$M_w/M_n$ is the molecular weight distribution determined by gel permeation chromatography (GPC)
The pressures in the examples are given in bar above
The propylene contents of the polymers were determined by The propylene contents of the polymers were determined by $^{13}$C-NMR spectroscopy and the crystallinity as relative crystallinity by IR spectroscopy.

The melt index MFI 190/2.16 was determined by DIN 53,735 and the density by DIN 53,479, process A.

The melting points were determined by DSC measurement.

EXAMPLE 1

In this Example, ethylenebis[1-(3-trimethylsilylindenyl)]zirconium dichloride was used as the metallocene. This compound can be present as a chiral isomer (in the form of a racemic mixture of two optically active enantiomers) or as an achiral meso isomer. The compound used had a racemate to meso form ratio of 3.5:1.

A dry 70 dm$^3$ boiler was first flushed with nitrogen and then with ethylene, and 40 dm$^3$ of liquid propylene were then added. 80 cm$^3$ of a methylaluminoxane solution in toluene (which corresponds to 114 mmol of Al and an average oligomerization degree n of 17) were then added, and the mixture was stirred at 30° C. for 15 minutes. The temperature was then raised to 55° C., which led to a pressure of 21.9 bar in the gas phase above the liquid. The addition of ethylene resulted in a total pressure of 45 bar. The partial pressure ratio $P_{C2}/P_{C3}$ was thus 1.05. Parallel to this, 8.0 mg of metallocene were dissolved in 30 cm$^3$ of a methylaluminoxane.solution in toluene (43 mmol of Al) and preactivated by letting the mixture stand for 15 minutes. The solution was then poured into the boiler, thus initiating the polymerization. The mixture was polymerized at 55° C. for 90 minutes, while maintaining the total pressure in the boiler constant at 45 bar by continuously feeding in ethylene.

The polymerization was then stopped by the addition of isopropanol. This gave 6.2 kg of polymer. The resulting product was in the form of a coarse-ground powder which had a bulk density of 0.35 g/cm$^3$ and the following particle size distribution determined by sifting:

| Particle size (μm) | Content (% by weight) | Sum (% by weight) |
| --- | --- | --- |
| <100 | 2.1 | 2.1 |
| 100–200 | 7.5 | 9.6 |
| 200–300 | 17.5 | 27.1 |
| 300–400 | 14.8 | 41.9 |
| 400–500 | 11.4 | 53.3 |
| 500–630 | 13.2 | 66.5 |
| 630–800 | 12.4 | 78.9 |
| 800–1000 | 11.4 | 90.3 |
| >1000 | 9.7 | 100.0 |

Furthermore, the following properties of the ethylene/propylene copolymer were determined:
VN = 166 cm$^3$/g
$M_w$ = 79,000 g/mol, $M_w/M_n$ = 35.8
MFI 190/2.16 = 8.03 g/10 min
Propylene content: 7.7 mol %
Crystallinity: 53%
Density: 0.921 g/cm$^3$
Melting point: 109.1° C.

EXAMPLE 2

In this Example, the same metallocene as in Example 1 was employed.

A dry 70 dm$^3$ boiler was first flushed with nitrogen and then with ethylene, and 40 dm$^3$ of liquid propylene were then added. 60 cm$^3$ of a methylaluminoxane solution in toluene (which corresponds to 86 mmol of Al and an average oligomerization degree n of 17) were then added, and the mixture was stirred at 30° C. for 15 minutes. The temperature was then raised to 51° C., which led to a pressure of 20.1 bar in the gas phase above the liquid. The addition of hydrogen resulted in a total pressure of 22.1 bar, and then in a total pressure of 50 bar by adding ethylene. The partial pressure ratio $P_{C2}/P_{C3}$ was thus 1.39.

Parallel to this, 5.3 mg of metallocene were dissolved in 20 cm$^3$ of a methylaluminoxane solution in toluene (28 mmol of Al) and preactivated by letting the mixture stand for 15 minutes. The solution was then poured into the boiler, thus initiating the polymerization. The mixture was polymerized at 51° C. for 60 minutes, while maintaining the total pressure in the boiler constant at 50 bar by continuously feeding in ethylene. The polymerization wa then stopped by the addition of isopropanol. This gave 2.1 kg of polymer. The resulting product was in the form of a coarse-ground powder consisting of spherical particles which had a bulk density of 0.47 g/cm$^3$ and the following particle size distribution determined by sifting:

| Particle size (μm) | Content (% by weight) | Sum (% by weight) |
| --- | --- | --- |
| <100 | 0.8 | 0.8 |
| 100–200 | 3.1 | 3.9 |
| 200–300 | 7.7 | 11.6 |
| 300–400 | 5.5 | 17.1 |
| 400–500 | 9.5 | 26.6 |
| 500–630 | 16.4 | 43.0 |
| 630–800 | 20.5 | 63.5 |
| 800–1000 | 22.0 | 85.5 |
| >1000 | 14.5 | 100.0 |

Furthermore, the following properties of the copolymer wax obtained above were determined:
VN = 63 cm$^3$/g
$M_w$ = 10,090 g/mol, $M_w/M_n$ = 20.1
Propylene content: 7.0 mol %
Crystallinity: 52%
Density: 0.903 g/cm$^3$ The product did not have a uniform melting point; the DSC curve showed peaks at 88° C., 101° C. and 114° C.

EXAMPLE 3

In this Example, the same metallocene as in Example 1 was employed.

A dry 70 dm$^3$ boiler was first flushed with nitrogen and then with ethylene, and 40 dm$^3$ of liquid propylene were then added. 50 cm$^3$ of a methylaluminoxane solution in toluene (which corresponds to 72 mmol of Al and an average oligomerization degree n of 17) were then added, and the mixture was stirred at 30° C. for 15 minutes. The temperature was then raised to 65° C., which led to a pressure of 26.8 bar in the gas phase above the liquid. The addition of hydrogen resulted in a total pressure of 28.3 bar, and then in a total pressure of 46 bar by adding ethylene. The partial pressure ratio $P_{C2}/P_{C3}$ was thus 0.66.

Parallel to this, 10.3 mg of metallocene were dissolved in 20 cm$^3$ of a methylaluminoxane solution in toluene (29 mmol of Al) and preactivated by letting the mixture stand for 15 minutes. The solution was then poured into the boiler, thus initiating the polymerization. The mixture was polymerized at 65° C. for 60 minutes, while maintaining the total pressure in the boiler constant at 46 bar by continuously feeding in ethylene The polymerization was then stopped by the addition of isopropanol. This gave 1.9 kg of ethylene/-propylene copolymer wax. The resulting product was in the form of a coarse-ground slightly tacky powder which had a bulk density of 0.45 g/cm$^3$.

Furthermore, the following properties of the polymer were determined:
VN=30 cm$^3$/g
Propylene content: 12.2 mol %
Crystallinity: 51%

EXAMPLE 4

In this Example, propylenebis(1-indenyl)zirconium dichloride was employed as the metallocene.

A dry 15 dm$^3$ boiler was first flushed with nitrogen, then with ethylene, and 10 dm$^3$ of liquid propylene were added. 30 cm$^3$ of a methylaluminoxane solution in toluene (which corresponds to 46 mmol of Al and an average oligomerization degree n of 22) were added, and the mixture was stirred at 30° C. for 15 minutes. This resulted in a pressure in the gas phase above the liquid of 12.2 bar. A total pressure of 33 bar was then established by the addition of ethylene and the partial pressure ratio $P_{C2}/P_{C3}$ was thus 1.7.

Parallel to this, 1.6 mg of metallocene was dissolved in 20 20 cm$^3$ of a methylaluminoxane solution in toluene (31 mmol of Al) and preactivated by letting the mixture stand for 15 minutes. The solution was poured into the boiler, thus initiating the polymerization. The mixture was polymerized for 70 minutes at 30° C., while maintaining the total pressure in the boiler constant at 33 bar by continuously feeding in ethylene. The polymerization was then stopped by releasing the pressure from the reactor. This gave 0.8 kg of polymer as a flocculent powder.

The following properties of the polymer were determined:
Propylene content: 8.5 mol %
Crystallinity: 54%
VN=380 cm$^3$/g
M$_w$=277,000 g/mol
M$_w$/M$_n$=10.2
MFI - 190/5=16.5 g/10 min.

EXAMPLE 5

In this Example, 1,1,4,4-tetramethyl-1,4-disilabutylenebis(1,-indenyl)zirconium dichloride was employed as the metallocene. 95% of the compound was present in the form of the racemic mixture of the chiral enantiomers.

The procedure analogous to Example 4 was repeated except that 2.2 mg of metallocene were employed. This gave 0.07 kg of polymer as a flocculent powder.

The following properties of the polymer were determined:
VN=310 cm$^3$/g
Propylene content: 10.3 mol %
Crystallinity: 52%

EAMPLE 6

In this Example, 2,2-dimethyl-2-silapropylenebis(1'-indenyl)hafnium dichloride was employed as the metallocene.

The procedure analogous to Example 4 was repeated, except that 5.1 mg of metallocene were employed. This gave 0.10 kg of polymer as a flocculent powder.

The following properties of the polymer were determined:
VN=350 cm$^3$/g
Propylene content: 9.8 mol %
Crystallinity: 54%

EXAMPLE 7

In this Example, bis(pentamethylcyclopentadienyl)-zirconium dichloride was employed as the metallocene.

A dry 70 dm$^3$ boiler was first flushed with nitrogen and then with ethylene, and 40 dm$^3$ of liquid propylene were then added. 60 cm$^3$ of a methylaluminoxane solution in toluene (which corresponds to 89 mmol of Al and an average oligomerization degree n of 19) were then added, and the mixture was stirred at 30° C. for 15 minutes. The temperature was then raised to 45° C., which led to a pressure of 17.6 bar in the gas phase above the liquid. The addition of ethylene resulted in a total pressure of 50 bar. The partial pressure ratio $P_{C2}/P_{C3}$ was thus 1.84.

Parallel to this, 5.0 mg of metallocene were dissolved in 60 cm$^3$ of a methylaluminoxane solution in toluene (89 mmol of Al) and preactivated by letting the mixture stand for 15 minutes. The solution was then poured into the boiler, thus initiating the polymerization. The mixture was polymerized at 45° C. for 80 minutes, while maintaining the total pressure in the boiler constant at 40 bar by continuously feeding in ethylene. The polymerization was then stopped by the addition of isopropanol. This gave 1.9 kg of ethylene/propylene copolymer. The resulting product was in the form of powder which had a bulk density of 0.2 g/cm$^3$.

Furthermore, the following properties of the polymer were determined:
VN=142 cm$^3$/g
M$_w$=200,000 g/mol, M$_w$/M$_n$=6.5
Propylene content: 3.5 mol %
Crystallinity: 57%
Density: 0.940 g/cm$^3$

We claim:

1. A process for the preparation of a predominantly crystalline ethylene/propylene copolymer containing no more than about 10.3 mol % of propylene units, relative to the entire polymer, by polymerization of ethylene and a 1-olefin comprising propylene in a suspending agent, at a temperature of −60° to 90° C., at a pressure of 0.5 to 150 bar, in the presence of a catalyst comprising a metallocene and an aluminoxane of the formula IV

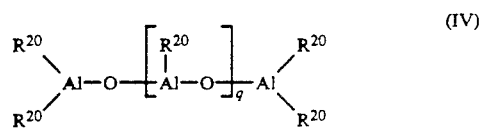

in the case of the linear type and/or of the formula V

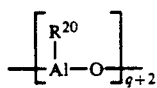 (V)

in the case of the cyclic type, in which in formulae IV and V $R^{20}$ is a $C_1$–$C_6$-alkyl group and q is an integer from 2 to 50, which comprises carrying out the polymerization in liquid propylene as suspending agent, in which the ratio of the partial pressure $P_{C2}$ of ethylene in the gas phase to the partial pressure $P_{C3}$ of propylene in the gas phase $$\frac{P_{C2}}{P_{C3}} \text{ is greater than } 0.6$$

and the metallocene is a compound of the formula I, II or III

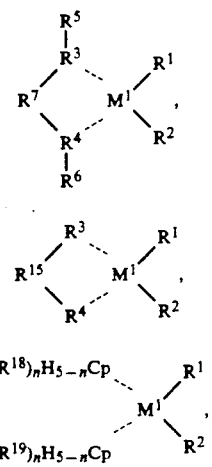

in which in formulae I, II and III $M^1$ is a metal from group IVb, Vb and VIb of the periodic table, $R^1$ and $R^2$ are identical or different and are a hydrogen atom, a $C_1$–$C_{10}$-alkyl gruop, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{10}$-aryalkenyl group or a halogen atom, $R^3$ and $R^4$ are identical or different and are an indenyl or tetrahydroindenyl radical in which the five-memebered rings of the radicals $R^3$ and $R^4$ form a sandwich structure with the central atom $M^1$, $R^5$ and $R^6$ are identical or different, and are substituents in the 3-position of $R^3$ and $R^4$ or are radicals of the formulae

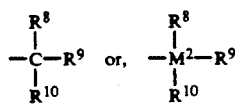

in which $R^2$ is silicon, germanium or tin, $R^6$, $R^9$ and $R^{10}$ are identical or different and are a halogen atom, a $C_1$–$C_{10}$-alkyl group, a $C_1$–$C_{10}$-fluoralkyl group, a $C_6$–$C_{10}$- aryl group, a $C_6$–$C_{10}$-fluoroaryl group, a $C_1$–$C_{10}$-alkoxy group, a $C_2$–$C_{10}$-alkenyl group, a $C_7$–$C_{40}$-alkoxy group, a $C_8$–$C_{40}$-arylalkenyl group, a $C_7$–$C_{40}$-alkylaryl group, a trihalosilyl group, a $C_1$–$C_{10}$-trialkylsilyl group or a $C_1$–$C_{10}$-trialkoxysilyl group, $R^7$ is

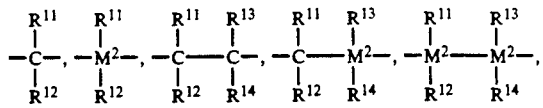

$=BR^{11}$, $=AlR^{11}$, —Ge—, —Sn—, —O—, —S—, $=S=O$, $=SO_2$, $=NR^{11}$, $=CO$, $=PR^{11}$ or $=P(O)R^{11}$, where $R^{11}$, $R^{12}$, $R^{13}$ and $R^{14}$ are identical or different and are a hydrogen atom, a halogen atom, a $C_1$–$C_{10}$-alkyl group, a $C_1$–$C_{10}$-fluoroalkyl group, a $C_1$–$C_{10}$-aryl group, a $C_6$–$C_{10}$-fluoroaryl group, a $C_1$–$C_{10}$-alkoxy group, a $C_2$–$C_{10}$-alkenyl, group, a $C_7$–$C_{40}$-arylakyl gruop, a $C_8$–$C_{40}$-arylalkenyl group, or a $C_7$–$C_{40}$-alkylaryl group and $R^7$ together with the radicals $R^3$ and $R^4$ forms a ring, $R^7$ being linked to the radicals $R^3$ and $R^4$ in the 1-position of the radicals $R^3$ and $R^4$, $R^{15}$ is

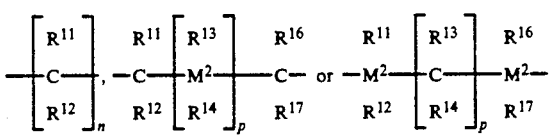

in which $R^{16}$ and $R^{17}$ are identical or different and are a hydrogen atom, a halogen atom, a $C_1$–$C_{10}$-alkyl group, a $C_1$–$C_{10}$-fluoroalkyl group, a $C_6$–$C_{10}$-aryl group, a $C_6$–$C_{10}$-fluoroaryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, n is the number 3, 4 or 5 and p is 1, 2 or 3, $R^{15}$ together with the radicals $R^3$ and $R^4$ forms a ring, $R^{15}$ being linked to the radicals $R^3$ and $R^4$ in the 1-position of the radicals $R^3$ and $R^4$, Cp is a cyclopentadienyl radical and $R^{18}$ and $R^{19}$ are identical or different substituents on the cyclopentadienyl radicals and are a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom.

2. The process as claimed in claim 1, wherein the polymerization is carried out in the presence of a 1-olefin having 4 to 18 carbon atoms.

3. The process as claimed in claim 1, wherein the metallocene is ethylenebis[1-(3-trimethylsilylindenyl)]-zirconium dichloride.

4. The process as claimed in claim 1, wherein the metallocene is propylenebis(1-indenyl)zirconium dichloride.

5. The process as claimed in claim 1, wherein the metallocene is bis(pentamethylcyclopentadienyl)zirconium dichloride.

6. A process for the preparation of a predominantly crystalline ethylene/propylene copolymer by polymerization of ethylene and a 1-olefin consisting essentially of propylene and, optionally, an additional 1-olefin having 4 to 18 carbon atoms, said process comprising:

polymerizing ethylene in liquid propylene, liquid propylene being the dispersing medium as well as a co-monomer, the ethylene being added to the polymerization mixture in such an amount that the ratio of the partial pressure $P_{C2}$ of ethylene is the gas phase to the partial pressure $P_{C3}$ of propylene in the gas phase, $$\frac{P_{C2}}{P_{C3}}$$

is greater than 0.6, the polymerization being carried out at a temperature of $-60°$ to $90°$ C., at a pressure of 0.5 to 150 bar, in the presence of a catalyst comprising a metallocene and an aluminoxane, such that the resulting ethylene/propylene copolymer is predominantly crystalline and contains propylene units but in an amount not exceeding about 10.3 mol % relative to the entire copolymer, said aluminoxane having the formula IV $$R^{20}\!\!\diagdown\!\!\underset{R^{20}}{\overset{}{Al}}\!\!-\!\!O\!\!-\!\!\left[\underset{\phantom{R^{20}}}{\overset{R^{20}}{\underset{|}{Al}}}\!\!-\!\!O\right]_{q}\!\!\overset{R^{20}}{\underset{R^{20}}{\diagup\!\!\!\!\diagdown}}\!\!Al \quad\quad (IV)$$

in the case of the linear type and/or of the formula V $$\left[\underset{\phantom{R^{20}}}{\overset{R^{20}}{\underset{|}{Al}}}\!\!-\!\!O\right]_{q+2} \quad\quad (V)$$

in the case of the cyclic type, wherein in formulae IV and V $R^{20}$ is a $C_1$-$C_6$ alkyl group and q is an integer from 2 to 50, and said metallocene consisting essentially of a compound of the formula I, II or III $$\begin{array}{c} R^5 \\ | \\ R^3 \diagdown \;\;\; \diagup R^1 \\ \;\;\; M^1 \\ R^7 \diagup \;\;\; \diagdown R^2 \\ R^4 \\ | \\ R^6 \end{array} \quad (I)$$

$$\begin{array}{c} R^3 \diagdown \;\;\; \diagup R^1 \\ \;\;\; M^1 \\ R^{15} \diagup \;\;\; \diagdown R^2 \\ R^4 \end{array} \quad (II)$$

$$\begin{array}{c} (R^{18})_nH_{5-n}Cp \diagdown \;\;\; \diagup R^1 \\ M^1 \\ (R^{19})_nH_{5-n}Cp \diagup \;\;\; \diagdown R^2 \end{array} \quad (III)$$

in which in formulae I, II and III $M^1$ is a metal from group IVb, Vb or VIb of the periodic table, $R^1$ and $R^2$ are identical or different and are a hydrogen atom, a $C_1$-$C_{10}$-alkyl gruop, a $C_1$-$C_{10}$-alkoxy group, a $C_6$-$C_{10}$-aryl group, a $C_6$-$C_{10}$-aryloxy group, a $C_2$-$C_{10}$-alkenyl group, a $C_7$-$C_{10}$-aryalkenyl group or a halogen atom, $R^3$ and $R^4$ are identical or different and are an indenyl or tetrahydroindenyl radical in which the five-memebered rings of the radicals $R^3$ and $R^4$ form a sandwich structure with the central atom $M^1$, $R^5$ and $R^6$ are identical or different, and are substituents in the 3-position of $R^3$ and $R^4$ or are radicals of the formulae $$-\underset{R^{10}}{\overset{R^8}{\underset{|}{\overset{|}{C}}}}\!\!-\!R^9 \quad \text{or,} \quad -\underset{R^{10}}{\overset{R^8}{\underset{|}{\overset{|}{M^2}}}}\!\!-\!R^9$$

in which $R^2$ is silicon, germanium or tin, $R^8$, $R^9$ and $R^{10}$ are identical or different and are a halogen atom, a $C_1$-$C_{10}$-alkyl group, a $C_1$-$C_{10}$-fluoralkyl group, a $C_6$-$C_{10}$- aryl group, a $C_6$-$C_{10}$-fluoroaryl group, a $C_1$-$C_{10}$-alkoxy group, a $C_2$-$C_{10}$-alkenyl group, a $C_7$-$C_{40}$-alkoxy group, a $C_8$-$C_{40}$-arylalkenyl group, a $C_7$-$C_{40}$-alkylaryl group, a trihalosilyl group, a $C_1$-$C_{10}$-trialkylsilyl group or a $C_1$-$C_{10}$-trialkoxysilyl group, $R^7$ is $$-\underset{R^{12}}{\overset{R^{11}}{\underset{|}{\overset{|}{C}}}}\!-,\; -\underset{R^{12}}{\overset{R^{11}}{\underset{|}{\overset{|}{M^2}}}}\!-,\; -\underset{R^{12}}{\overset{R^{11}}{\underset{|}{\overset{|}{C}}}}\!-\!\underset{R^{14}}{\overset{R^{13}}{\underset{|}{\overset{|}{C}}}}\!-,\; -\underset{R^{12}}{\overset{R^{11}}{\underset{|}{\overset{|}{C}}}}\!-\!\underset{R^{14}}{\overset{R^{13}}{\underset{|}{\overset{|}{M^2}}}}\!-,\; -\underset{R^{12}}{\overset{R^{11}}{\underset{|}{\overset{|}{M^2}}}}\!-\!\underset{R^{14}}{\overset{R^{13}}{\underset{|}{\overset{|}{M^2}}}}\!-,$$

$=BR^{11}$, $=AlR^{11}$, $-Ge-$, $-Sn-$, $-O-$, $-S-$, $=S=O$, $=SO_2$, $=NR^{11}$, $=CO$, $=PR^{11}$ or $=P(O)R^{11}$, where $R^{11}$, $R^{12}$, $R^{13}$ and $R^{14}$ are identical or different and are a hydrogen atom, a halogen atom, a $C_1$-$C_{10}$-alkyl group, a $C_1$-$C_{10}$-fluoroalkyl group, a $C_1$-$C_{10}$-aryl group, a $C_6$-$C_{10}$-fluoroaryl group, a $C_1$-$C_{10}$-alkoxy group, a $C_2$-$C_{10}$-alkenyl, group, a $C_7$-$C_{40}$-arylakyl gruop, a $C_8$-$C_{40}$-arylalkenyl group, or a $C_7$-$C_{40}$-alkylaryl group and $R^7$ together with the radicals $R^3$ and $R^4$ forms a ring, $R^7$ being linked to the radicals $R^3$ and $R^4$ in the 1-position of the radicals $R^3$ and $R^4$, $R^{15}$ is $$\left[\underset{R^{12}}{\overset{R^{11}}{\underset{|}{\overset{|}{C}}}}\right]_n,\; -\underset{R^{12}}{\overset{R^{11}}{\underset{|}{\overset{|}{C}}}}\!-\!\left[\underset{R^{14}}{\overset{R^{13}}{\underset{|}{\overset{|}{M^2}}}}\right]_p\!\!-\!\underset{R^{17}}{\overset{R^{16}}{\underset{|}{\overset{|}{C}}}}\!-\; \text{or}\; -\underset{R^{12}}{\overset{R^{11}}{\underset{|}{\overset{|}{M^2}}}}\!-\!\left[\underset{R^{14}}{\overset{R^{13}}{\underset{|}{\overset{|}{C}}}}\right]_p\!\!-\!\underset{R^{17}}{\overset{R^{16}}{\underset{|}{\overset{|}{M^2}}}}\!-$$

in which $R^{16}$ and $R^{17}$ are identical or different and are a hydrogen atom, a halogen atom, a $C_1$-$C_{10}$-alkyl group, a $C_1$-$C_{10}$-fluoroalkyl group, a $C_6$-$C_{10}$-aryl group, a $C_6$-$C_{10}$-fluoroaryl group, a $C_1$-$C_{10}$-alkoxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group, n is the number 3, 4 or 5 and p is 1, 2 or 3, $R^{15}$ together with the radicals $R^3$ and $R^4$ forms a ring, $R^{15}$ being linked to the radicals $R^3$ and $R^4$ in the 1-position of the radicals $R^3$ and $R^4$, Cp is a cyclopentadienyl radical and $R^{18}$ and $R^{19}$ are identical or different substituents on the cyclopentadienyl radicals and are a $C_1$-$C_{10}$-alkyl group, a $C_1$-$C_{10}$-alkoxy group, a $C_6$-$C_{10}$-aryl group, a $C_6$-$C_{10}$-aryloxy group, a $C_2$-$C_{10}$-alkenyl group, a $C_7$-$C_{40}$-arylalkyl group, a $C_7$-$C_{40}$-alkylaryl group, a $C_8$-$C_{40}$-arylalkenyl group or a halogen atom.

7. The process as claimed in claim 6, wherein said additional 1-olefin is present during the polymerization.

8. The process as claimed in claim 6, wherein the ratio $P_{C2}/P_{C3}$ is greater than 0.9.

9. The process as claimed in claim 6, wherein the polymerization is carried out under temperature and pressure conditions of 20° to 70° C. and 14.5 to 120 bar.

10. The process as claimed in claim 6, wherein the concentration of said metalocene, relative to the transition metal, is $10^{-3}$ to $10^{-8}$ mole of transition metal per $dm^3$ of liquid propylene.

11. The process as claimed in claim 6, wherein $R^1$ and $R^2$ are hydrogen, chlorine, $C_1$–$C_3$-alkyl, $C_1$–$C_3$-alkoxy, $C_6$–$C_8$ aryl, $C_6$–$C_8$-aryloxy, $C_2$–$C_4$-alkenyl, $C_7$–$C_{10}$ arylalkyl, $C_7$–$C_{12}$-alkylaryl, or $C_8$–$C_{12}$-arylalkenyl.

* * * * *

UNITED STATES PATENT AND TRADEMARK OFFICE
CERTIFICATE OF CORRECTION

PATENT NO. : 5,086,134

DATED : February 4, 1992

INVENTOR(S) : Martin Antberg, et al

It is certified that error appears in the above-identified patent and that said Letters Patent is hereby corrected as shown below:

At column 3, line 8, "$R_1$" should read --$R^{15}$--.

At column 3, line 32, "$C_8$-$C_{40}$-arylalkyl" should read --$C_7$-$C_{40}$-arylalkyl--.

At column 4, line 2, "preferbly" should read --preferably--.

At column 5, line 54, "(II)" should read --(I)--.

At column 5, line 56, "type B" should read --type A--, and "propylenebis" should read --ethylenebis--.

At column 5, line 59, "III" should read --II--.

At column 6, line 57, "preferably $C_1$-$C_{10}$-" should read --preferably $C_1$-$C_4$- --.

At column 6, line 59, "$C_7$14" should read --$C_7$- --.

At column 8, line 37, "$Pc_2Pc_3$" should read --$Pc_2/Pc_3$--.

At column 10, line 27, "wa" should read --was--.

UNITED STATES PATENT AND TRADEMARK OFFICE
CERTIFICATE OF CORRECTION

PATENT NO. : 5,086,134

DATED : February 4, 1992

INVENTOR(S) : Martin Antberg, et al

It is certified that error appears in the above-identified patent and that said Letters Patent is hereby corrected as shown below:

At column 14, line 15, after second occurrence of "group," delete "$C_1$" and insert --$C_6$--.

At column 14, line 19, "gruop" should read --group--.

<u>In claim 6</u>

At column 15, line 39, "formula" should read --formulae--.

At column 15, line 63, "gruop" should read --group--.

At column 15, line 65, after second occurrence of "group", insert --a $C_7$-$C_{40}$-arylalkyl group, a $C_7$-$C_{40}$-alkylaryl group,--.

At column 15, line 65, delete "$C_7$-$C_{10}$" and insert --$C_8$-$C_{40}$--.

At column 16, line 1 "memebered" should read --membered--.

At column 16, line 12, delete "$R^2$" and insert --$M^2$--.

UNITED STATES PATENT AND TRADEMARK OFFICE
CERTIFICATE OF CORRECTION

PATENT NO. : 5,086,134

DATED : February 4, 1992

INVENTOR(S) : Martin Antberg, et al

It is certified that error appears in the above-identified patent and that said Letters Patent is hereby corrected as shown below:

In column 11, line 36, strike "20", second occurrence.

In claim 1:

At column 13, line 44, "gruop" should read --group--.

At column 13, line 47, after the second occurrence of "group," insert --a $C_7$-$C_{40}$-arylalkyl group, a $C_7$-$C_{40}$-alkylaryl group,--.

At column 13, line 47, delete "$C_7$-$C_{10}$" and insert --$C_8$-$C_{40}$--.

At column 13, line 51, "memebered" should read --membered--.

At column 13, line 63, delete "$R^2$" and insert --$M^2$--, also delete "$R^6$" and insert --$R^8$--.

At column 13, line 68, delete "alkoxy" and insert ---arylalkyl--.

UNITED STATES PATENT AND TRADEMARK OFFICE
CERTIFICATE OF CORRECTION

PATENT NO. : 5,086,134

DATED : Februrary 4, 1992

INVENTOR(S) : Martin Antberg, et al

It is certified that error appears in the above-identified patent and that said Letters Patent is hereby corrected as shown below:

At column 16, line 14, "fluoralkyl" should read --fluoroalkyl--.

At column 16, line 17, delete "alkoxy" and insert --arylalkyl--.

At column 16, line 33, after second occurrence of "group", delete "$C_1$" and insert --$C_6$--.

At column 16, line 35 "arylakyl" should read --arylalkyl--.

At column 16, line 36, "gruop" should read --group--.

<u>In claim 10:</u>

At column 18, line 1, "metalocene" should read --metallocene--.

Signed and Sealed this

Sixth Day of July, 1993

Attest:

MICHAEL K. KIRK

*Attesting Officer*    Acting Commissioner of Patents and Trademarks